(12) United States Patent
Tuthill et al.

(10) Patent No.: US 11,985,952 B2
(45) Date of Patent: *May 21, 2024

(54) ANIMAL BEDS

(71) Applicant: HEBE STUDIO LTD, Oxfordshire (GB)

(72) Inventors: James Tuthill, Oxfordshire (GB); Johannes Paul, London (GB); Simon Nicholls, Northhamptonshire (GB); William Windham, Oxfordshire (GB)

(73) Assignee: HEBE STUDIO LTD, Oxfordshire (GB)

( * ) Notice: Subject to any disclaimer, the term of this patent is extended or adjusted under 35 U.S.C. 154(b) by 52 days.

This patent is subject to a terminal disclaimer.

(21) Appl. No.: 17/846,454

(22) Filed: Jun. 22, 2022

(65) Prior Publication Data

US 2022/0312724 A1 Oct. 6, 2022

Related U.S. Application Data

(63) Continuation of application No. 16/879,995, filed on May 21, 2020, now Pat. No. 11,419,307.

(30) Foreign Application Priority Data

May 21, 2019 (GB) ..................................... 1907184

(51) Int. Cl.
*A01K 1/03* (2006.01)
*A01K 1/035* (2006.01)

(52) U.S. Cl.
CPC ................................. *A01K 1/0353* (2013.01)

(58) Field of Classification Search
CPC .... A01K 1/035; A01K 1/0353; A47C 17/645; A47C 17/705; A47C 19/024; A47C 31/10; A47C 31/11
See application file for complete search history.

(56) References Cited

U.S. PATENT DOCUMENTS

| | | | | |
|---|---|---|---|---|
| 441,527 | A * | 1/1890 | Wilson | A47J 47/005 |
| 2,212,485 | A * | 8/1937 | Krasnov | A47C 31/11 |
| 4,169,428 | A | 10/1979 | Waugh | |
| 6,591,778 | B1 | 7/2003 | Alderman | |
| 2003/0075111 | A1 * | 4/2003 | Greenfield | A01K 29/00 119/28.5 |
| 2006/0272581 | A1 | 12/2006 | Dunn | |
| 2008/0127898 | A1 * | 6/2008 | Morse | A01K 1/035 119/28.5 |
| 2012/0318206 | A1 * | 12/2012 | van Leeuwen | A01K 29/00 119/416 |

* cited by examiner

*Primary Examiner* — Joshua J Michener
*Assistant Examiner* — Henry Hooper Mudd
(74) *Attorney, Agent, or Firm* — Taft Stettinius & Hollister LLP; Stephen F. Rost

(57) ABSTRACT

A kit for converting an animal bed having a core and a cover into a raised animal bed includes a support surface insertable into the animal bed so as to lie between the core and a part of the cover that forms the underside of the bed in use. The kit also includes a plurality of legs and fixings for coupling the legs to the support surface through part of the cover.

16 Claims, 7 Drawing Sheets

ANIMAL BEDS

RELATED APPLICATIONS

This application is a continuation of U.S. patent application Ser. No. 16/879,995, filed May 21, 2020, which claims priority to U.K. Patent Application Ser. No. 1907184.4, filed May 21, 2019, and U.K. Patent Application Ser. No. 1911615.1, filed Aug. 14, 2019, the disclosures of which are hereby incorporated by reference in their entirety.

FIELD OF THE DISCLOSURE

The present disclosure relates to improvements to animal beds, particularly but not exclusively to dog beds. One illustrative aspect of the present disclosure relates to a kit for converting an animal bed into a raised animal bed. Another illustrative aspect of the disclosure relates to a cover for an animal bed, and a further aspect of the disclosure relates to an animal bed.

Arrangements embodying the teachings of the present disclosure will be described hereafter with reference to beds for dogs, but this should not be construed as being a limitation of the scope of the present disclosure, as such beds could conceivably be used by a variety of different animals.

BACKGROUND

Animal beds, such as a dog bed for example, typically comprise a core and a removable cover for the core. A conventional floor-lying bed that is available from Omlet Ltd, Tuthill Park, Wardington, Oxfordshire OX17 1RR, United Kingdom is depicted in FIG. 1. This dog bed comprises a padded core and a removable outer cover that includes a peripheral bolster. The cover can be taken off the core for cleaning in a washing machine.

While this illustrative dog bed provides a comfortable bed for a dog, it is the case that some dogs (and indeed their owners) prefer their beds to be elevated from the floor so that the bed is less likely to move around when the dog climbs on and off the bed.

To this end it has previously been proposed to provide items of furniture which essentially comprise a supporting frame, mounted on legs, for an animal bed of the type described above. One illustrative example is the "Raised Wooden Dog Bed" available from Charley Chau Limited, Unit 16, Astra Road, Astra Business Park, Guinness Road, Manchester M17 1SU, United Kingdom. This solid wood product, while being fit for its purpose, is expensive to ship to customers, large and cumbersome to move around, non-portable, cannot readily be disassembled and is expensive.

It has also previously been proposed to provide more elaborate "pet sofas" such as, for example, the Antoinette Pet Sofa available from Lord Lou, Cruquiuszoom 37, 2142 EW Cruquius, The Netherlands, which again while being fit for an intended purpose is expensive (in terms of shipping and purchase), non-portable and cannot be disassembled (which can be a particular problem if the fabric of the sofa (as opposed to the cushion) should be dirtied by the animal).

Another drawback associated with previously proposed floor-lying and raised animal beds is that one cannot readily be converted into the other.

Aspects of the present disclosure have been devised with the foregoing in mind.

SUMMARY

In accordance with a present embodiment of the present disclosure, there is provided a kit for converting a floor-lying animal bed comprising a core and a cover into a raised animal bed, the kit comprising: a support surface insertable into the animal bed so as to lie between the core and a part of the cover that forms the underside of the bed in use; a plurality of legs, and fixings for coupling the legs to the support surface through the part of the cover. By virtue of this arrangement, floor-lying animal beds can readily and quickly be converted into raised beds.

In one embodiment, the fixings may comprise screws. The screws may comprise double-ended screws. The support may include a plurality of retainers configured to cooperate with the fixings to couple the legs to the support. The retainers may comprise a plurality of captive nuts embedded in the support. The fixings may comprise bolts that can be coupled to the captive nuts.

The cover has a plurality of through-holes provided in the part of the cover that forms the underside of the bed in use. This arrangement reduces the likelihood of the cover being damaged.

Each through-hole is configured to align with a respective retainer in the support when the support has been inserted into the animal bed so as to lie between the core and the part of the cover that forms the underside of the bed in use. The cover may be reinforced in the vicinity of the through holes. The reinforcement may be provided by means of a plurality of eyelets.

The core may comprise a padded body, a foam body or a bean bag.

Another aspect of the present disclosure relates to a cover for an animal bed, the cover being configured and arranged for use with the kit described herein.

A further aspect of the disclosure comprises a raised animal bed comprising a kit as described herein.

In another implementation of the teachings of the present disclosure, there is provided a cover for an animal bed, the cover comprising a plurality of surfaces that cooperate to define an internal void for receiving an animal bed core, the cover being openable to enable access to be had to the void, the cover further comprising a plurality of through-holes provided in one of the surface that forms the underside of the animal bed in use.

The cover may be reinforced in the vicinity of the through holes. The reinforcement may be provided by a plurality of eyelets, each eyelet being associated with a respective one of the through-holes.

Another implementation of the teachings of the present disclosure provides a raised animal bed comprising a cover and a core, wherein the cover comprises a plurality of panels that cooperate to define an internal void, the cover being openable to permit the core to be inserted into the void, a panel of the cover that forms the underside of the animal bed in use including a plurality of through-holes; the bed further comprising a support surface locatable within the void between the core and the panel of the cover that forms the underside of the bed so that respective ones of a plurality of retainers provided in the support surface are aligned with respective through-holes in the cover, and a plurality of legs each having a leg fixing associated therewith, each leg fixing being insertable through a respective through-hole and into engagement with a respective retainer in the support surface to couple the legs to the support surface through the cover.

The retainers comprise captive nuts embedded in the support surface and the fixings comprise bolts engageable with the nuts.

Other features, advantages and embodiments of the present disclosure are set out elsewhere in the present application.

BRIEF DESCRIPTION OF THE DRAWINGS

Various aspects of the teachings of the present disclosure, and arrangements embodying those teachings, will hereafter be described by way of illustrative example with reference to the accompanying drawings, in which.

DETAILED DESCRIPTION

Figure 1:
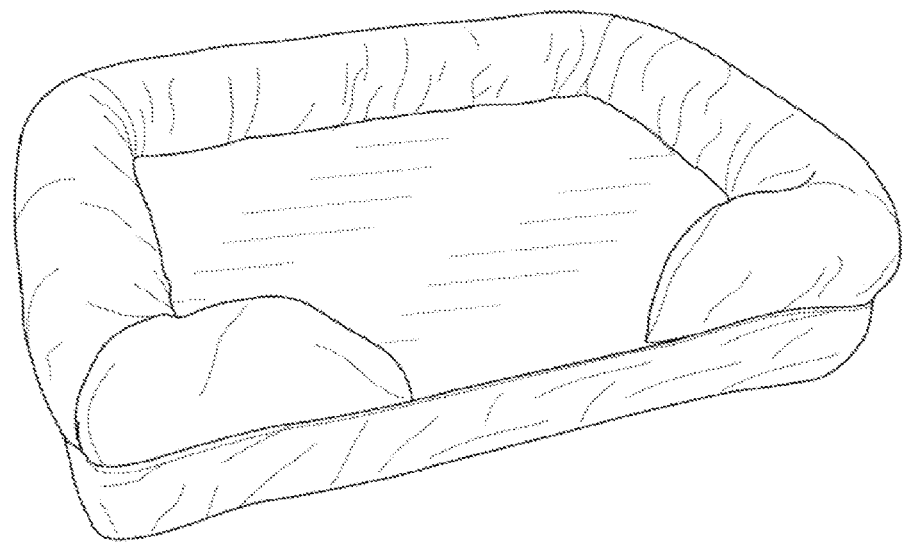
FIG. 1 is a schematic representation of a conventional floor-lying dog bed.
Figure 2:
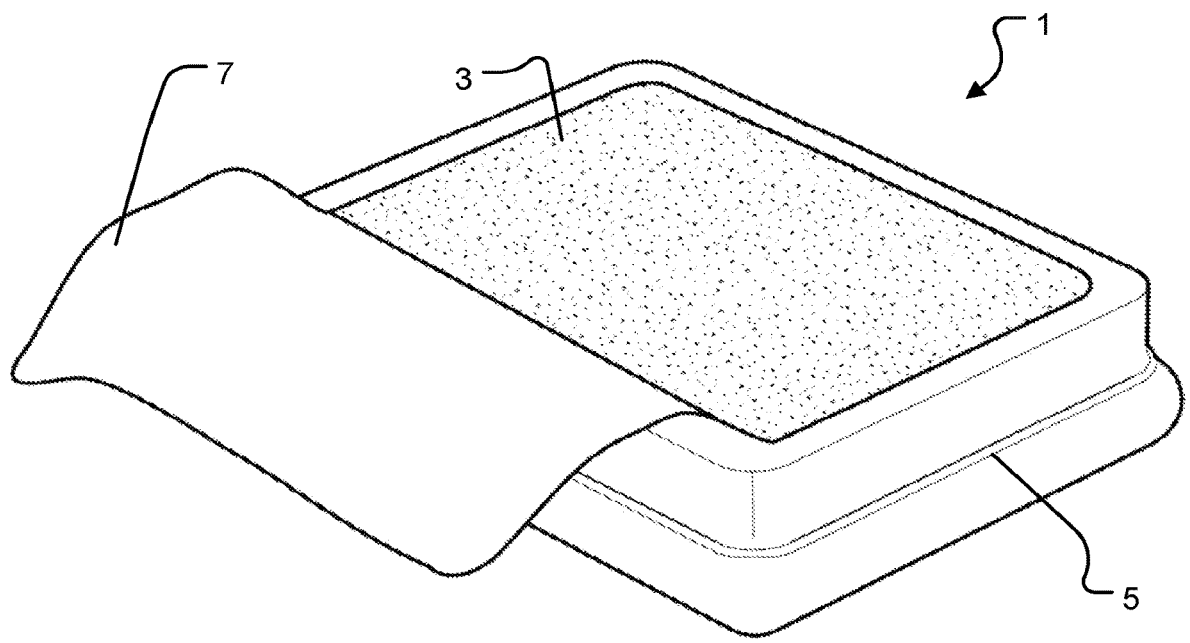
FIG. 2 is a schematic representation of the underside of a conventional animal bed.

Referring now to FIG. 2, there is depicted a schematic representation of the underside of an illustrative conventional animal bed 1, in this instance a dog bed. In this example, the bed 1 has a generally rectangular footprint, but it will be appreciated that the shape of the bed may be varied as desired.

The bed 1 comprises an outer cover 5, e.g., formed of a fabric material, that defines an internal void within which an inner core 3 is enclosed. Typically, the core is compressible, but it needn't necessarily be so. The cover, as will be appreciated, protects the core from damage and helps keep the core clean. In this instance a panel 7 forming the underside of the bed 1 is detachable (at least in part) from the remainder of the cover so that the core can be removed, and the cover can be cleaned. To that end, it is desirable for the cover to be machine-washable.

While the panel 7 may be provided on the underside of the bed 1, it will be appreciated that this is not essential and the panel could comprise a sidewall, or indeed the top wall, of the bed. Similarly, while the cover and core may be separable to enable the cover to be cleaned, it is only necessary for the core to be accessible in order to implement the teachings of the present disclosure.

The panel 7 is coupled to the remainder of the cover by means of a zip fastener that extends, in this arrangement around three sides of the panel. In alternative arrangements the panel 7 could be secured to the remainder of the cover by another type of fastener, for example, buttons, press studs, a two-part mechanical hook and loop mechanism (such as Velcro™) or by any of a variety of alternatives the like of which will be immediately apparent to persons of skill in the art.

The inner core 3 comprises, in this example, a rectangular cuboid foam structure configured to fit within the cover 5. It will be appreciated, however, that a variety of different types of core could instead be provided. For example, the core could comprise a padded body (akin to a pillow), memory foam, a bean bag or a variety of other alternatives the like of which will be immediately apparent to persons of skill in the art. In some arrangements the core is of a hypoallergenic material that may also include an appropriate biocide and/or stain resistant compound.

Figure 3:
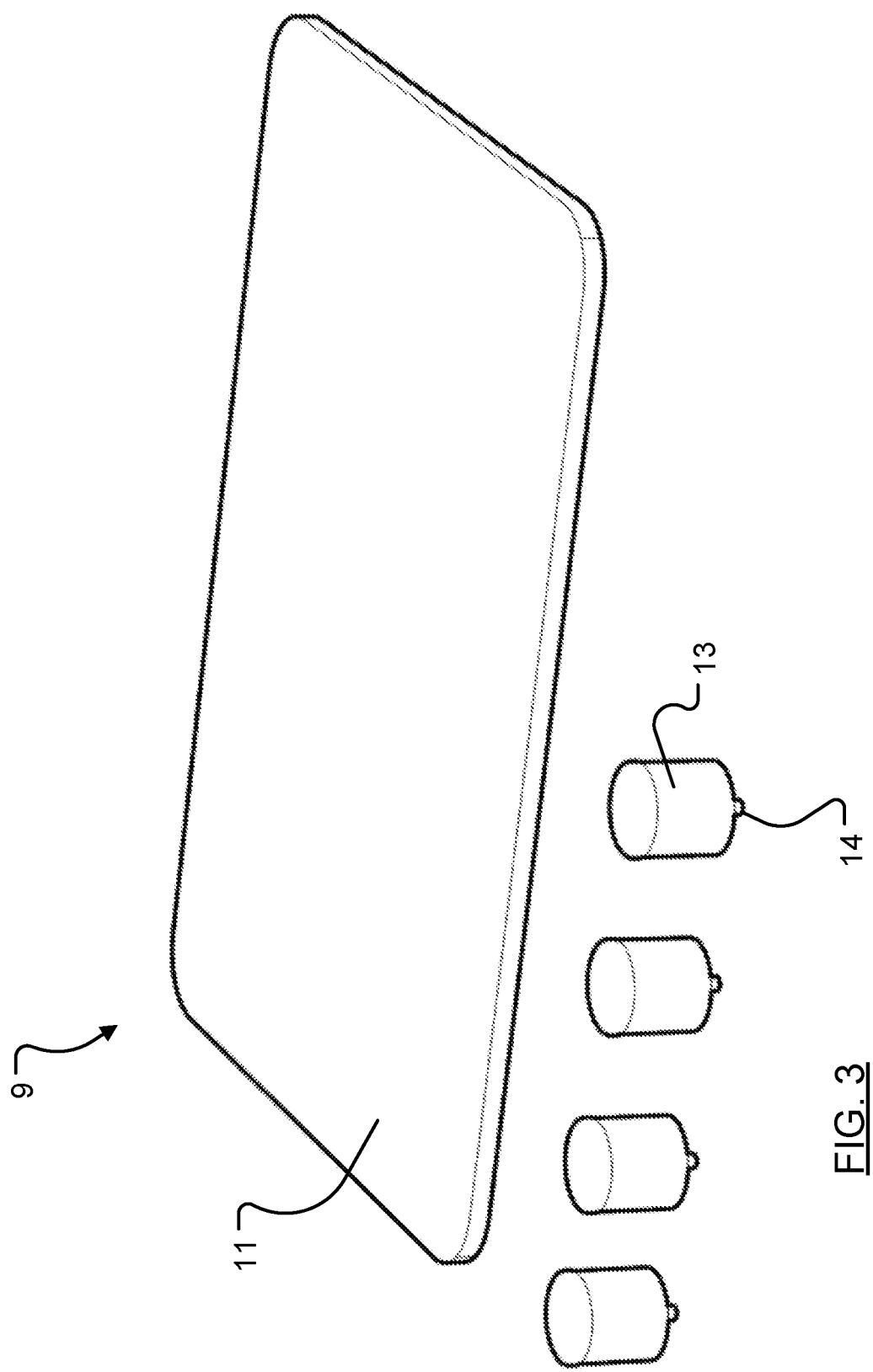
FIG. 3 is a schematic representation of a kit that embodies the teachings of the present disclosure.

Referring now to FIG. 3 of the drawings, there is depicted a kit 9 that embodies a first aspect of the present disclosure. The kit 9 is configured for converting the bed 1 of FIG. 2 into a raised bed and comprises a planar support surface 11 (for example, of wood, plastics or other stiff material) that can be inserted into the bed 1 so that the support surface 11 lies between the core 3 and the outer cover 5, in one envisaged arrangement between the core 3 and the panel 7 of the cover that forms the underside of the bed 1. The kit further comprises a plurality of legs 13 and fixings 14 (shown coupled to the legs 13) enabling the legs to be connected to the support surface through the outer cover to raise the bed. In this instance four identical legs are provided, but it will be appreciated that a fewer or great number of legs may be provided and that they needn't be identical.

The fixings could comprise any of a number of different types of fixing. For example, in one envisaged arrangement they could each comprise a double-ended screw—one end being screwable into a given leg and the other end being screwable into the support surface through the cover.

It is also envisaged that the legs could be moulded around a part of the fixing, leaving the remainder of the fixing extending from the leg so that it can be connected (for example, screwed) into the support surface.

To use the kit, a user need only insert the support surface into the bed (for example, by releasing panel 7 and sliding the support surface into the void) so that it lies on top of the core and between the cover and the core. The user need only then reattach panel 7 to the remainder of the cover and affix the legs to the support surface through the cover to provide a raised bed. Advantageously, since the animal bed cores are generally compressible, the kit can be used with many (if not all) different types of animal bed.

Figure 4:
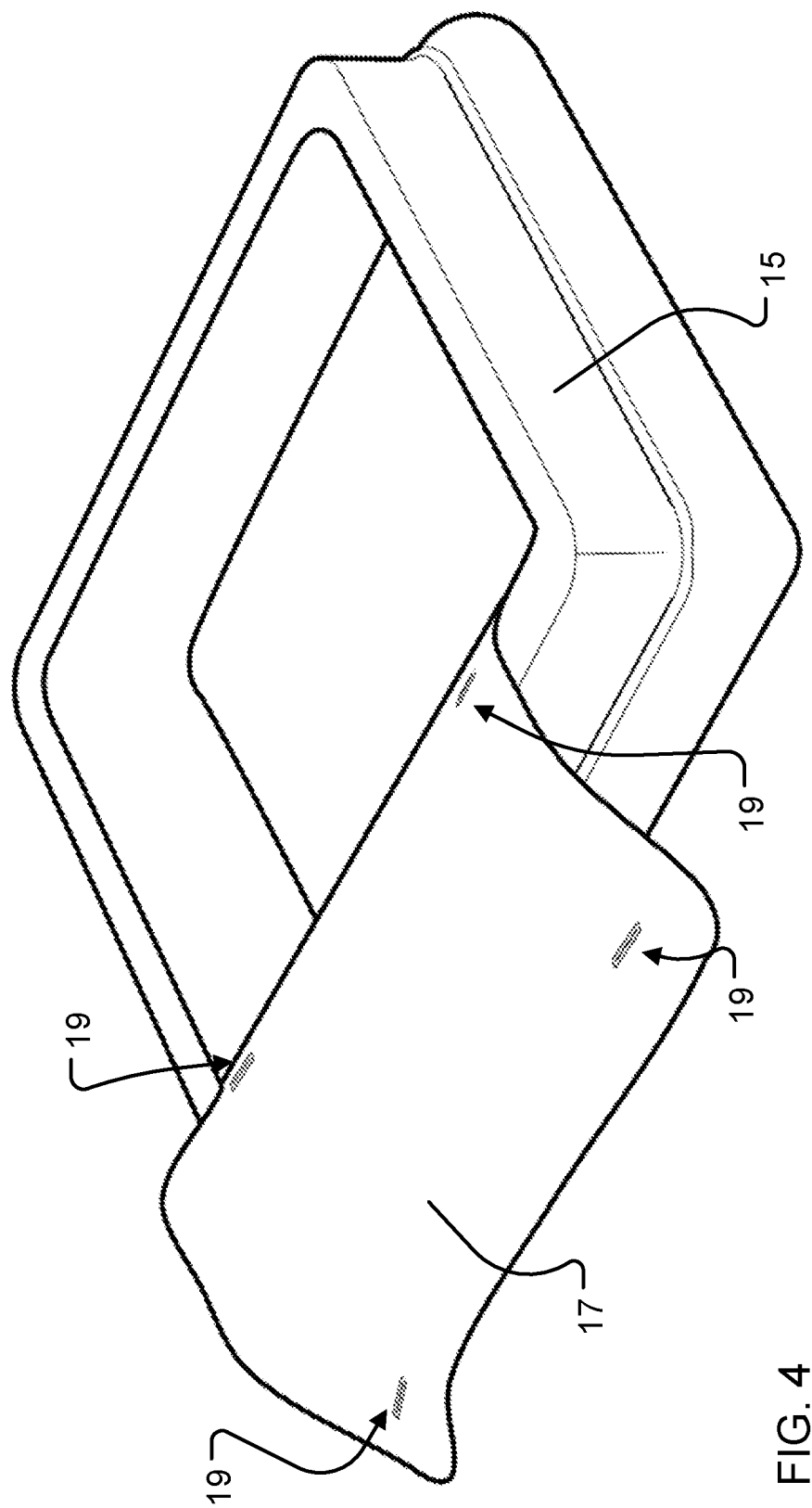
FIG. 4 is a schematic representation of a cover for an animal bed.

While this implementation of the teachings of the disclosure does allow the bed to be raised, it is recognized that repeated disconnection and reattachment of the legs from the support surface may result in undue wear to the underside of the cover. To that end, in accordance with another aspect of the present disclosure, there is provided a cover 15 for an animal bed as shown in FIG. 4 of the drawings.

In this embodiment, the cover 15 includes a panel 17 (that forms the underside of the bed in use) that is provided with a plurality of through-holes 19. The through-holes are sized to allow a the fixing to be screwed through the through-holes 19 and into the support surface without causing damage to the cover. This arrangement is advantageous in that it allows the bed to be disassembled (for example, for cleaning of the cover) and reassembled without affecting the integrity of the cover.

Figure 5:
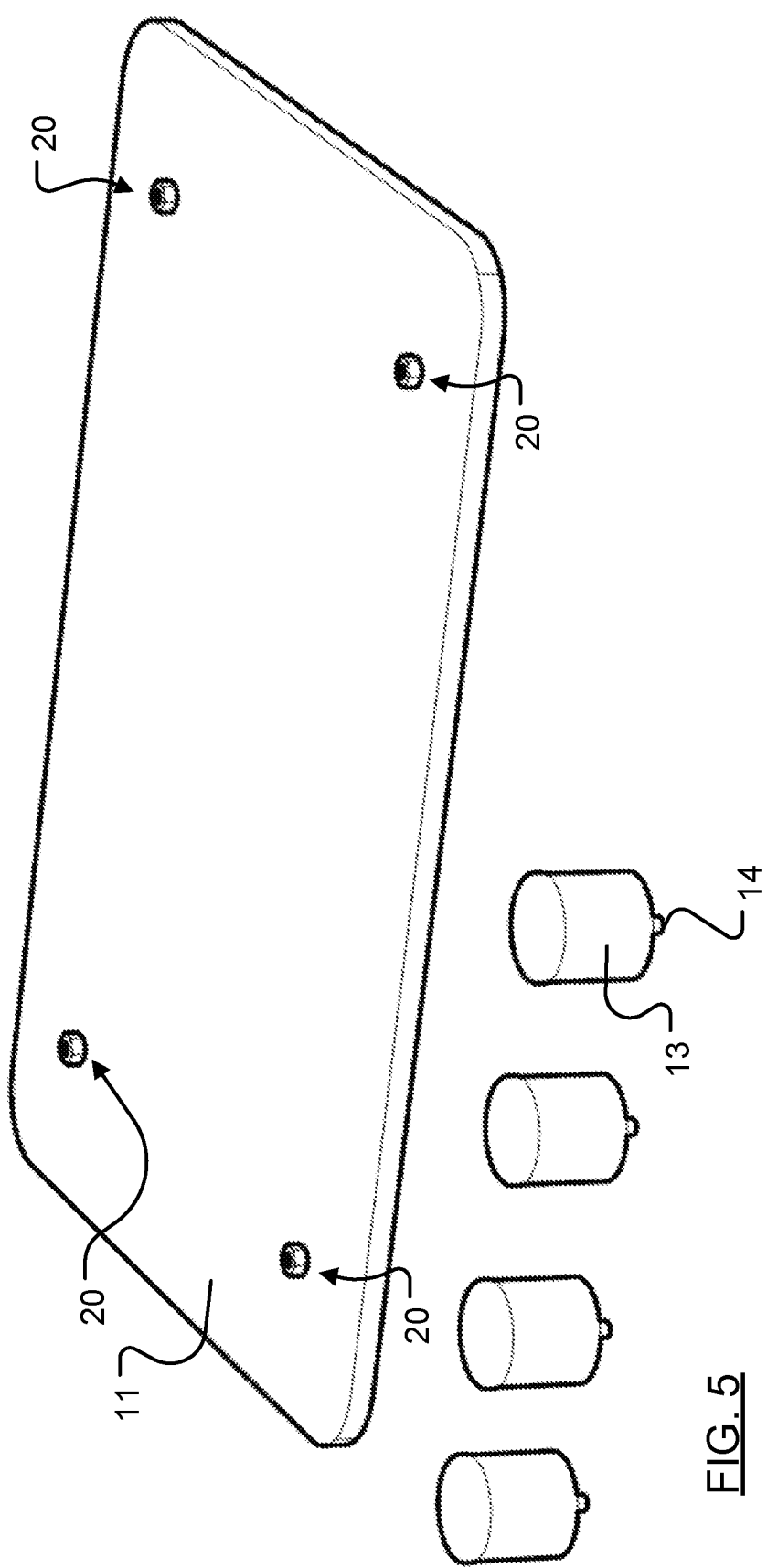
FIG. 5 is a schematic representation of another kit that embodies the teachings of the present disclosure.

In one particular embodiment depicted in FIG. 5, the kit may comprise a support surface 11 that is provided with a plurality of retainers 20 that are configured to align with the through-holes 19 so that appropriate connectors attached to the legs may be pushed through the through-holes 19 to mate and couple with the retainers. For example, the retainers could comprise captive nuts, and the connectors may comprise bolts fittable or pre-fitted to respective legs.

In an envisaged implementation eyelets may be fitted to the cover to reinforce the aforementioned through-holes 19. Alternatively, the respective parts of the cover that surround the through-holes may be reinforced, for example, by means of stitching or by affixing a more resilient material to the cover in the vicinity of the through-holes 19.

Figure 6:
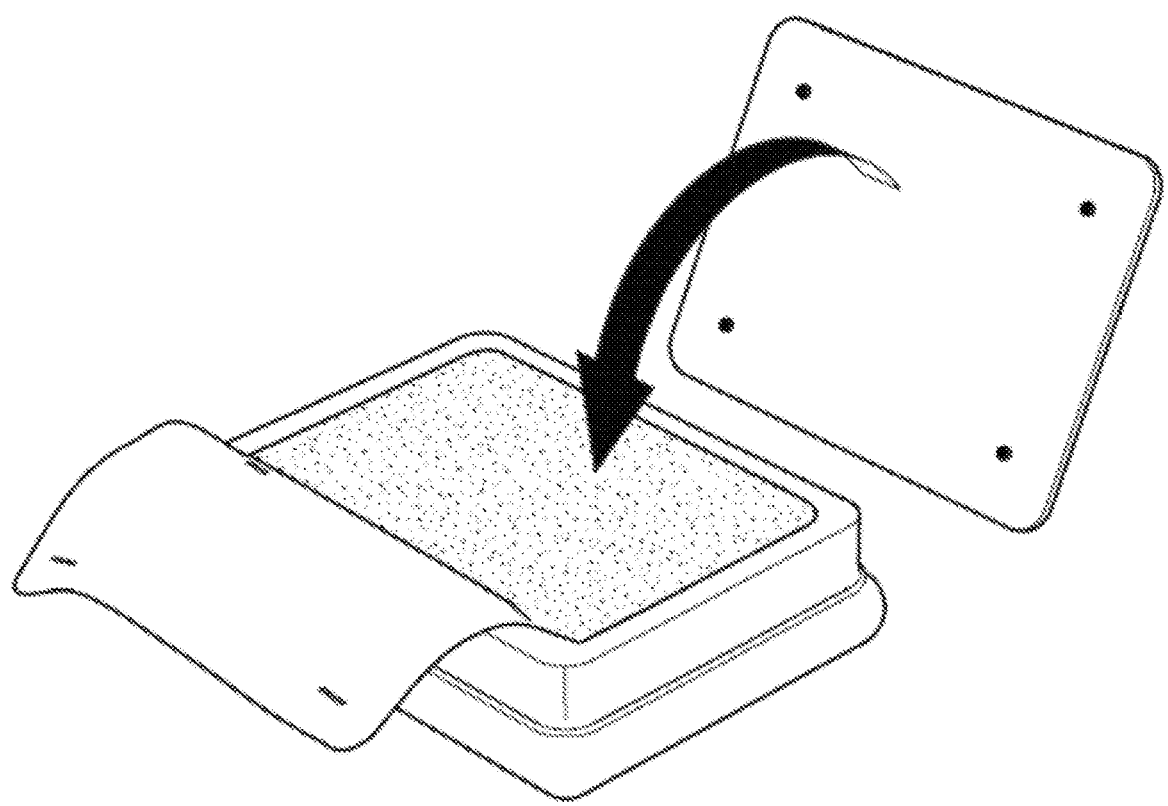
FIGS. 6 and 7 are schematic representations of the steps in a conversion process.
Figure 7:
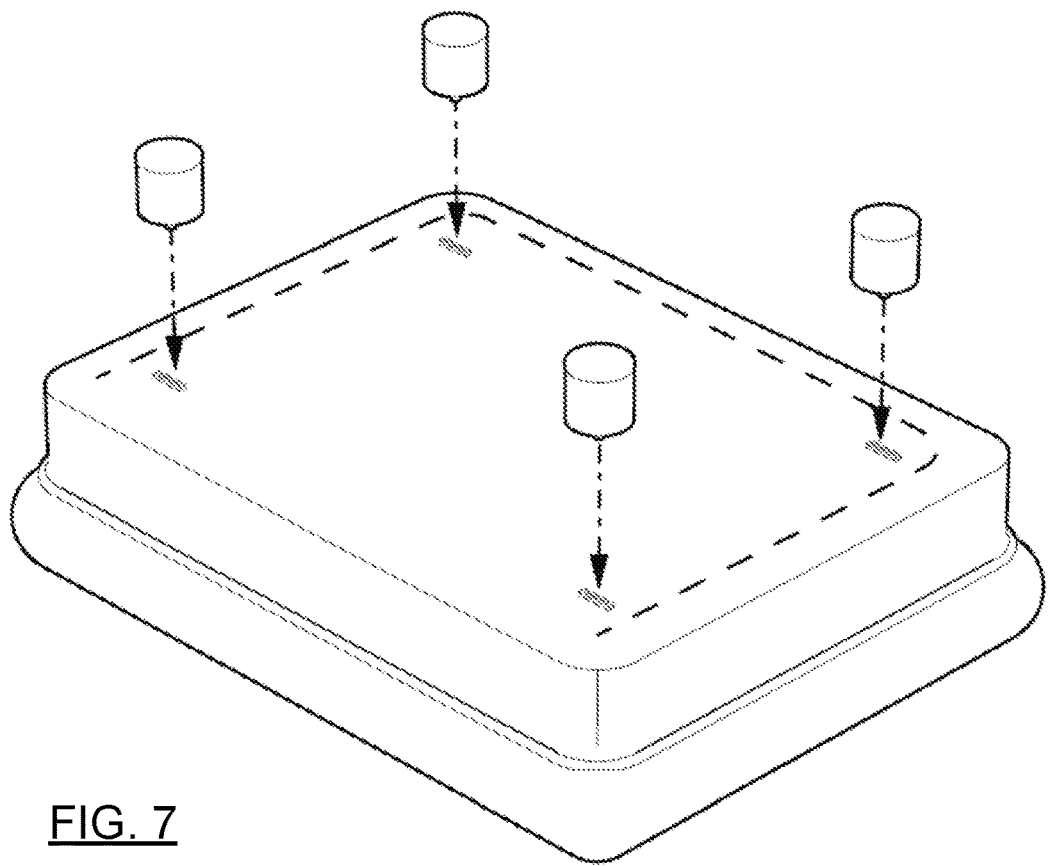

As before, to use the kit a user need only insert the support surface into the bed (for example, by releasing panel 17 and sliding the support surface into the void as shown in FIG. 6) so that it lies on top of the core and between the cover and the core. The user need only then reattach panel 17 to the remainder of the cover and affix the legs to the support surface (as shown in FIG. 7) through the cover to provide a raised bed.

Figure 8:
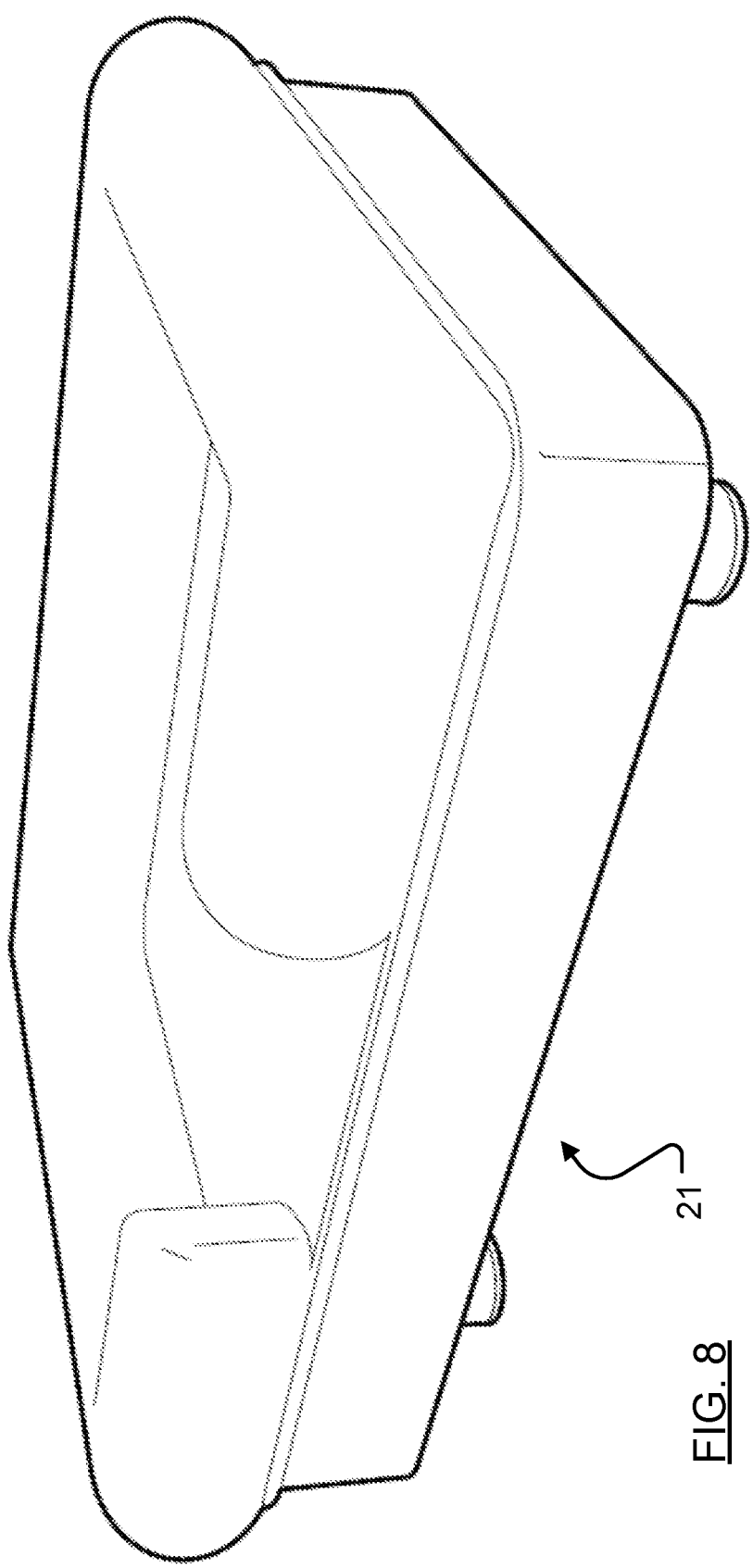
FIG. 8 is a schematic perspective view of an animal bed in which a kit embodying the teachings of the disclosure has been installed to provide a raised animal bed.

It will be apparent from the foregoing that aspects of the present disclosure readily enable the conversion of a conventional animal bed into a raised animal bed 21 such as that which is depicted in FIG. 8, in some cases without affecting the integrity of the cover of the bed. Transport of the bed can be facilitated as compared with a ready-made raised bed, and users can switch between raised and floor-lying beds as they wish. Advantageously, the kit also allows any given bed that provides access to the core to be converted into a raised bed. This means that animals can still use beds with which they have become familiar and do not have to get used to a new bed.

It will be appreciated that while various aspects and embodiments of the present disclosure have heretofore been described, the scope of the present disclosure is not limited to the particular arrangements set out herein and instead extends to encompass all arrangements, and modifications and alterations thereto, which fall within the scope of the appended claims.

Figure 9:
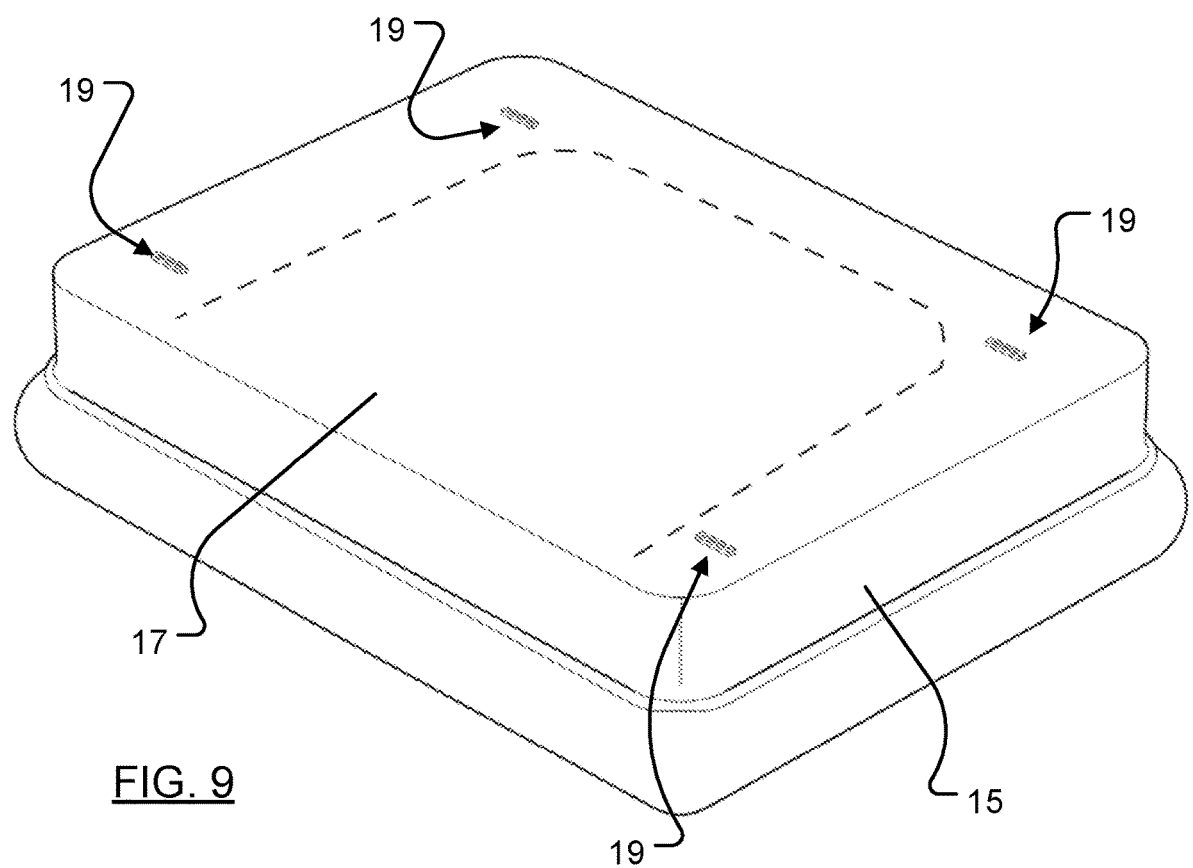
FIG. 9 is a schematic representation of another cover for an animal bed.

For example, while in FIG. 4 the through-holes 19 are provided in the panel 17 of the cover 15, this is not an essential feature of the present disclosure. In another envisaged implementation shown schematically in FIG. 9, the through-holes 19 may be provided in a region of the cover adjacent to the panel 17. In yet another envisaged implementation that is not depicted in the drawings, some through-holes may be provided in the panel 17 and others in the cover 15.

It should also be noted that while the accompanying claims set out particular combinations of features described herein, the scope of the present disclosure is not limited to the particular combinations hereafter claimed, but instead extends to encompass any combination of features herein disclosed.

Finally, it should be noted that any element in a claim that does not explicitly state "means for" performing a specified function, or "steps for" performing a specific function, is not to be interpreted as a "means" or "step" clause as specified in 35 U.S.C. Sec. 112, par. 6. In particular, the use of "step of" in the claims appended hereto is not intended to invoke the provisions of 35 U.S.C. Sec. 112, par. 6.

The invention claimed is:

1. A raised animal bed, comprising:
a cover and a core, wherein the cover defines an internal void in which the core is located, wherein the cover includes a releasing panel, the releasing panel being openable to permit the core to be inserted into the void, wherein the releasing panel has a plurality of through-holes and each of the through holes is reinforced;
a support surface provided within the void between the core and the releasing panel of the cover that forms an underside of the bed in use; and
a plurality of legs each having a leg fixing associated therewith, each leg fixing being insertable through the plurality of through holes and into engagement with the support surface to couple the legs to the support surface through the cover;
wherein the legs and support surface constitute a kit that is separable from the cover and core of the raised bed so that the raised bed can be reconfigured so as to be suitable for use as a floor-lying bed.

2. The raised animal bed according to claim 1, wherein the leg fixings comprise screws.

3. The raised animal bed according to claim 2, wherein the screws comprise double-ended screws.

4. The raised animal bed according to claim 1, wherein the support surface includes a plurality of retainers configured to cooperate with the leg fixings to couple the legs to the support surface.

5. The raised animal bed according to claim 4, wherein the retainers comprise a plurality of captive nuts embedded in the support surface.

6. The raised animal bed according to claim 5, wherein the leg fixings comprise bolts that can be coupled to the captive nuts.

7. The raised animal bed according to claim 1, wherein the plurality of through-holes provided in the releasing panel are reinforced with one of eyelets, stitching, or a more resilient material than the cover that forms the underside of the bed in use.

8. The raised animal bed according to claim 7, wherein each of the plurality of through-holes is configured to align with a respective retainer in the support surface when the support surface has been inserted into the animal bed so as to lie between the core and the part of the cover that forms the underside of the bed in use.

9. The raised animal bed according to claim 8, wherein the legs contact the plurality of through holes where reinforced.

10. The raised animal bed according to claim 9, wherein the reinforcement is provided by means of a plurality of eyelets.

11. The raised animal bed according to claim 1, wherein the core comprises a padded body, a foam body or a bean bag.

12. The raised animal bed according to claim 1, wherein the cover comprises a plurality of panels that cooperate to define the internal void.

13. The raised animal bed according to claim 1, wherein the releasing panel of the cover is detachable and reattachable to the cover.

14. The raised animal bed according to claim 1, wherein the cover has a plurality of through-holes provided in the cover other than in the releasing panel of the cover.

15. The raised animal bed according to claim 1 further comprising a fastener configured to couple the releasing panel to the cover.

16. The raised animal bed according to claim 15 wherein the fastener includes one of a zip fastener, buttons, press studs, or hook and loop fasteners.

* * * * *